United States Patent
DiCicco et al.

(10) Patent No.: US 11,958,010 B2
(45) Date of Patent: Apr. 16, 2024

(54) THERMAL DESORBER ASSEMBLY FOR HIGH-VOLUME SAMPLING FILTERS

(71) Applicants: Signature Science, LLC, Charlottesville, VA (US); Government of The United States of America, as represented by the Secretary of Homeland Security, Washington, DC (US)

(72) Inventors: Joseph A. DiCicco, Cape May Court House, NJ (US); Paul M. Flanigan, IV, Marlton, NJ (US); David Perry, Austin, TX (US); John Brady, Medford, NJ (US); Barry Smith, Egg Harbor City, NJ (US)

(73) Assignees: Signature Science, LLC, Charlottesville, VA (US); Government of the United States of America, as represented by the Secretary of Homeland Security, Washington, DC (US)

( * ) Notice: Subject to any disclaimer, the term of this patent is extended or adjusted under 35 U.S.C. 154(b) by 361 days.

(21) Appl. No.: 17/395,782

(22) Filed: Aug. 6, 2021

(65) Prior Publication Data

US 2022/0040622 A1 Feb. 10, 2022

Related U.S. Application Data

(60) Provisional application No. 63/062,081, filed on Aug. 6, 2020.

(51) Int. Cl.
*B01D 46/84* (2022.01)
*B01D 46/00* (2022.01)
*B01D 46/42* (2006.01)
*B01D 46/44* (2006.01)
(Continued)

(52) U.S. Cl.
CPC ......... *B01D 46/84* (2022.01); *B01D 46/0002* (2013.01); *B01D 46/4263* (2013.01); *B01D 46/448* (2013.01); *G01N 1/2205* (2013.01); *B01D 2265/023* (2013.01); *B01D 2265/028* (2013.01); *G01N 2001/022* (2013.01); *G01N 2001/028* (2013.01)

(58) Field of Classification Search
CPC ......... B01D 46/0002; G01N 2001/022; G01N 2001/028
See application file for complete search history.

(56) References Cited

U.S. PATENT DOCUMENTS 6,297,950 B1 * 10/2001 Erwin .................. G06F 1/20
 361/688
6,446,514 B1 * 9/2002 Danylewych-May ... G01N 1/02
 73/864.71

(Continued)

*Primary Examiner* — Ryan D Walsh
(74) *Attorney, Agent, or Firm* — Ballard Spahr LLP (57) ABSTRACT

Disclosed is a thermal desorber assembly for desorbing substances collected on a high-volume sampling (HVS) filter. The assembly includes, among other elements, a filter holder for securing a HVS filter within the assembly, a desorber body, and an insulating enclosure. The design of the thermal desorber assembly is such that it can accommodate a variety of different types of HVS filter media. Also described herein is a system comprising the thermal desorber assembly and method of using the assembly.

20 Claims, 9 Drawing Sheets

(51) Int. Cl.
G01N 1/02 (2006.01)
G01N 1/22 (2006.01)

(56) References Cited

U.S. PATENT DOCUMENTS

| | | | | |
|---|---|---|---|---|
| 7,364,917 | B2* | 4/2008 | Ichimura | G01N 1/2214 |
| | | | | 422/50 |
| 7,947,949 | B2* | 5/2011 | Chen | G01N 1/405 |
| | | | | 250/281 |
| 8,220,312 | B2* | 7/2012 | Nacson | G01N 1/2226 |
| | | | | 73/31.03 |
| 9,048,076 | B2* | 6/2015 | Stott | H01J 49/04 |
| 9,329,156 | B2* | 5/2016 | Nacson | G01N 1/2214 |
| 10,220,390 | B2* | 3/2019 | Triva | B01L 3/5055 |
| 11,237,083 | B1* | 2/2022 | Cho | G01N 1/405 |
| 2010/0126284 | A1* | 5/2010 | Boudries | G01N 1/405 |
| | | | | 73/863.12 |
| 2010/0274155 | A1* | 10/2010 | Battrell | B01L 3/502715 |
| | | | | 600/572 |
| 2012/0152038 | A1* | 6/2012 | Cho | G01N 1/44 |
| | | | | 73/863.12 |
| 2015/0143929 | A1* | 5/2015 | Volckens | G01N 1/2273 |
| | | | | 73/863.11 |
| 2022/0040621 | A1* | 2/2022 | Dicicco | B01D 46/44 |
| 2022/0040648 | A1* | 2/2022 | Dicicco | B01F 35/513 |

* cited by examiner

THERMAL DESORBER ASSEMBLY FOR HIGH-VOLUME SAMPLING FILTERS

CROSS-REFERENCE TO RELATED APPLICATION

This application claims priority to and the benefit of the filing date of U.S. Provisional Patent Application No. 63/062,081, filed Aug. 6, 2020, which is incorporated herein by reference in its entirety.

FIELD

This application relates generally to a thermal desorber assembly useful for desorbing a high-volume sampling (HVS) filter and methods for using the desorber assembly.

BACKGROUND

Sampling and detection methodologies are currently being developed by a variety of researchers to detect contraband material. The detection of contraband material is challenging because of the possible number of signature molecules, their wide range of chemical structures, and their vast range of vapor pressures. Storing contraband materials in enclosed spaces may allow for a buildup of the vapor pressure for that material, which may enable chemical identification of the vapor inside the container if sampled and analyzed.

However, the identification of contraband material becomes increasingly difficult in an asymmetric threat scenario because of the size of the containers that may be concealing targets, the presence of interferents from the cargo or previous fumigation of the containers, and the operational constraints, which require high throughput. In addition, identification is only further complicated as a majority of contraband materials have a very low vapor pressure, which provides only trace amounts of the material in the vapor phase for identification. Any vapor that may be produced tends to adsorb onto or adhere to surfaces within the container.

In addition to the aforementioned complications associated with vapor sampling of contraband materials, vapor screening of large transport systems presents another difficulty. Thus, most systems used for vapor screening of these containers have utilized high volume sampling (HVS) systems to sample larger volumes of air and pass the sampled air to special pre-concentrator filters to capture contraband vapors for subsequent analysis and identification. There is currently a need in the art for a thermal desorber capable of adequately desorbing substances collected on a HVS filter. This need and others are met by the following disclosure.

SUMMARY

Disclosed herein, in one aspect, is a thermal desorber assembly for a high-volume sampling (HVS) filter. The thermal desorber assembly can comprise a filter holder having a first portion and a second portion hingedly secured to the first portion. The first and second portions can be configured to rotate about a hinged axis from an open position to a closed position. The first and second portions can each define a respective filter hole. At least one of the first or second portions defines a recess that at least partially surrounds the respective filter hole and is configured to receive a filter therein. The filter holes of the first and second portions can align when the first and second portions are in the closed position. The first and second portions can cooperate to secure the filter in place within the recess of the at least one of the first and second portions when the first and second portions are in the closed position.

The thermal desorber assembly can further comprise a desorber body defining a cavity configured to receive the filter holder when the first and second portions of the holder are in the closed position. The desorber body can further define an inlet configured to connect to a mass flow controller and an outlet configured to connect to a vapor collection system or an analytical detection system. The inlet and the outlet can at least partially align with the recessed filter holes of the first and second portions of the filter holder when the filter holder is inserted into the cavity. Optionally, the desorber body can also comprise a recessed area to receive an O-ring (e.g., a high temperature O-ring, such as an O-ring comprising KALREZ material). The desorber body can further define one or more holes configured to receive a cartridge heater, a thermocouple, or resistance temperature detector probe therein.

The desorber assembly can also comprise an insulating enclosure configured to receive the desorber body therein. The insulating enclosure can define an opening configured to receive one or more cartridge heater wire leads, one or more thermocouple wire leads, or one or more resistance temperature detector probe wire leads, and can further define port openings at least partially aligned with the inlet and the outlet of the desorber body when the desorber body is inserted into the insulating enclosure. Optionally, the enclosure can also comprise extruded tabs with thru holes to attach a hinged lid.

In a further aspect, disclosed herein is a thermal desorber assembly system for a high-volume sampling (HVS) filter, comprising a filter holder having a first portion and a second portion hingedly secured to the first portion, wherein the first and second portions are in a closed position about a hinged axis. The first and second portions can each define a respective filter hole. At least one of the first or second portions defines a recess that at least partially surrounds the respective filter hole and is configured to receive a filter therein. The filter holes of the first and second portions can align when the first and second portions are in the closed position. The first and second portions can cooperate to secure the filter in place within the recess of the at least one of the first and second portions when the first and second portions are in the closed position.

The system further comprises a desorber body defining a cavity comprising the filter holder. The desorber body further defines an inlet connected to a mass flow controller and an outlet connected to a vapor collection system or an analytical detection system, wherein the inlet and the outlet at least partially align with the recessed filter holes of the first and second portions of the filter holder, and wherein the desorber body further defines one or more holes comprising a cartridge heater, a thermocouple, or a resistance temperature detector probe therein.

The system further comprises an insulating enclosure comprising the desorber body therein. The insulating enclosure defines an opening comprising one or more cartridge heater wire leads, one or more thermocouple wire leads, or one or more resistance temperature detector probe wire leads, and further defines port openings at least partially aligned with the inlet and the outlet of the desorber. The port openings receive a line connected to a mass flow controller for introducing purge gas into the system and an exhaust line connected to a vapor collection system or an analytical detection system.

Additional advantages of the disclosed thermal desorber assembly and method will be set forth in part in the description which follows, and in part will be understood from the description, or may be learned by practice of the disclosed assembly and method. The advantages of the disclosed assembly and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed thermal desorber assembly and method and together with the description, serve to explain the principles of the disclosed assembly and method.

DETAILED DESCRIPTION

The disclosed thermal desorber assembly and method may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

Tt must be noted that as used herein and in the appended claims, the singular forms "a," "an," and "the" include plural references unless the context clearly dictates otherwise. Thus, for example, reference to "a cavity" includes a plurality of such cavities, and reference to "the cavity" is a reference to one or cavities and equivalents thereof known to those skilled in the art, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally." it is contemplated that values within up to 15%, up to 10%, up to 5%, or up to 1% (above or below) of the particularly stated value or characteristic can be included within the scope of those aspects. In further optional aspects, when angles or angular relationships are approximated by use of the antecedents "about." "substantially," or "generally," it is contemplated that values within up to 15 degrees, up to 10 degrees, up to 5 degrees, or up to 1 degree (above or below) of the particularly stated angle or angular relationship can be included within the scope of those aspects.

Unless defined otherwise, all technical and scientific terms used herein have the same meanings as commonly understood by one of skill in the art to which the disclosed appliance and method belong. Although any thermal desorber unit and method similar or equivalent to those described herein can be used in the practice or testing of the present unit and method, the particularly useful units and methods are as described.

Throughout the description and claims of this specification, the word "comprise" and variations of the word, such as "comprising" and "comprises," means "including but not limited to," and is not intended to exclude, for example, other elements, components, integers or steps. In particular, in methods stated as comprising one or more steps or operations, it is specifically contemplated that each step comprises what is listed (unless that step includes a limiting term such as "consisting of"), meaning that each step is not intended to exclude, for example, other elements, components, integers or steps that are not listed in the step.

B. Filter Holder

Disclosed herein is a thermal desorber assembly suitable for desorbing substances collected on a HVS filter. The desorber assembly can include, among other elements, a filter holder. According to one aspect, the filter holder can be designed to hold and secure a HVS filter in the thermal desorber assembly.

Figures 1A, 1B:
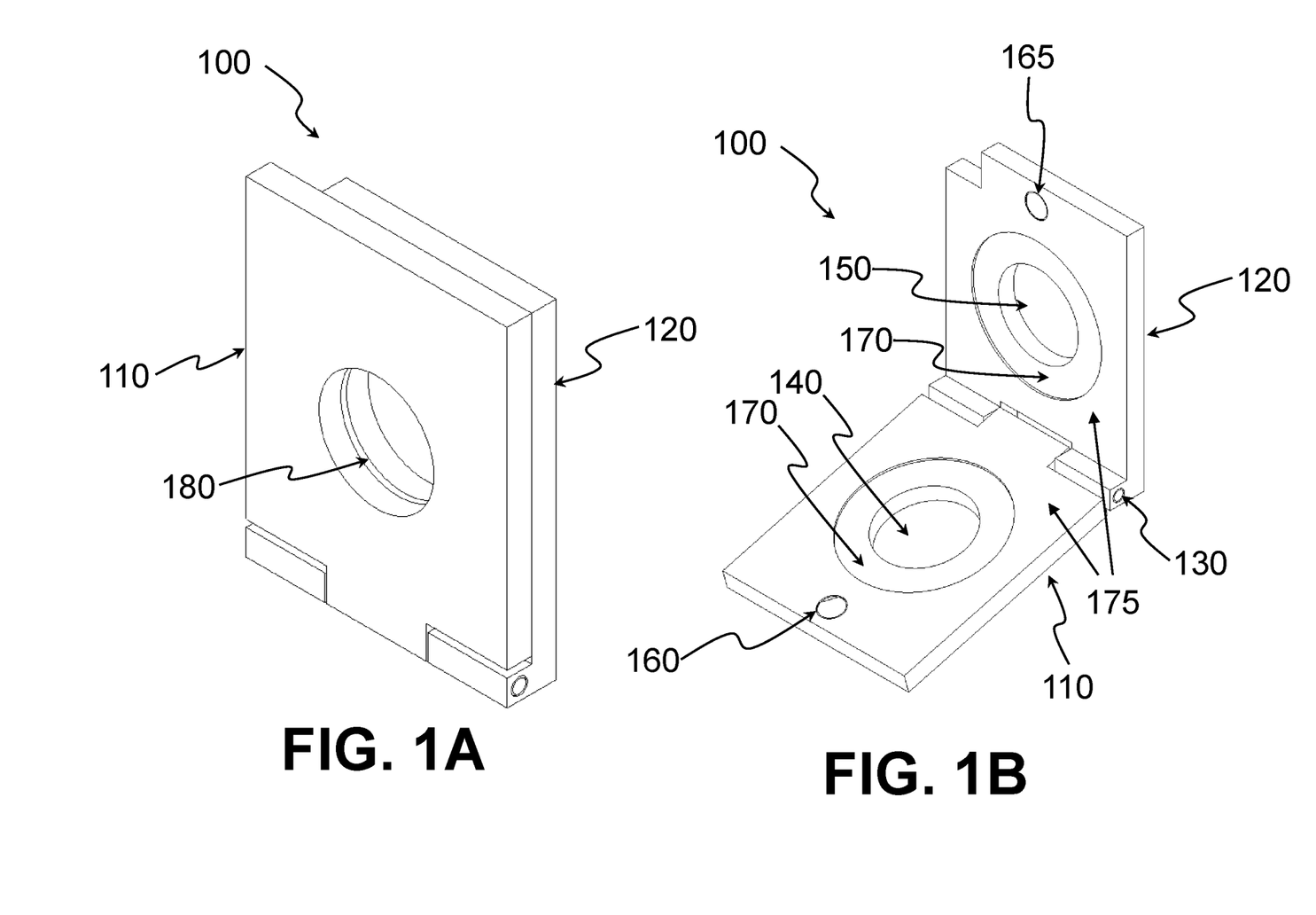
FIGS. 1A-B depict an exemplary embodiment of a filter holder in closed (FIG. 1A) and open (FIG. 1B) positions as disclosed herein.

An exemplary embodiment of the filter holder is depicted in FIGS. 1A-B. According to one aspect, filter holder 100 can comprise a first portion 110 and a second portion 120 secured together about hinged axis 130. First portion 110 and second portion 120 can be configured to rotate about hinged axis 130 from an open position, as depicted in FIG. 1B, to a closed position, as depicted in FIG. 1A. The first and second portions 110, 120 can define inner surfaces 175 that, in the closed position, oppose and, optionally, abut each other.

First portion 110 and second portion 120 can define respective filter holes 140, 150 that extend through the thicknesses of the respective first and second portions. At least one of the first portion or the second portion can define a recess 170 that extends outwardly from (or is positioned outwardly of) the inner surface 175 of the respective inner or outer portion. The recess(es) 170 can at least partially (optionally, entirely) surround the respective filter hole 140, 150. With the first and second portion 110, 120 in the closed position, the recess 170 can define, or the recesses 170 (in embodiments in which both the first and second portions define respective recesses) can cooperatively define, a filter-receiving opening 180 that is configured to receive an outer periphery of an HVS filter therein with an inner portion of the HVS filter aligned with the filter through holes 140, 150. In various aspects, the filter-receiving opening 180 can be rectangular, square, circular, oval, oblong, or any suitable shape to receive the HVS filter. The filter-receiving opening 180 can have a depth that is configured to receive a thickness of the HVS filter. Filter holes 140 and 150 can align and secure the HVS filter in place when first portion 110 and second portion 120 are in the closed position, as shown in FIG. 1A. The size of filter holes 140 and 150 can be selected to fit filters having a variety of diameters and depths. Thus, in some aspects, a system can comprise multiple filter holders that are configured and sized to accommodate particular HVS filters, and the filter holders can be interchanged as necessary (for example, based on the particular filter type used), with the same thermal desorber assembly.

According to one aspect, first portion 110 and second portion 120 can be configured to be retained in the closed position. For example, in some exemplary aspects, first portion 110 and second portion 120 can each comprise a respective magnet (160 and 165) that are oriented to attract each other when the first and second portions are in the closed position. First portion 110 and second portion 120 can magnetically secure to one another through magnets 160 and 165 when first portion 110 and second portion 120 are in the closed position as shown in FIG. 1A. In one aspect, magnets 160 and 165 can be magnets suitable for withstanding the high temperatures reached in the thermal desorber assembly. For example, it is contemplated that one or more samarium-cobalt magnets can be used. In various aspects, the magnets can have any suitable dimensions. For example, the magnets can have a thickness of between 0.05 inches and ½ inch and a major dimension (e.g., diameter) of between 0.1 and ½ inch. Such magnets are commercially available off-the-shelf. The respective magnets 160, 165 can be coupled to first portion 110 and second portion 120 using methods known in the art, e.g., using high-temperature epoxy.

Although magnets are suitable for securing first portion 110 and second portion 120 in the closed position, other suitable mechanisms for securing the portions are also contemplated. For example, a latch or a fastener, such as, for example, a screw (optionally, a set screw) can be used to secure the first and second portions 110, 120 in the closed position.

Filter holder 100 can be made from a material suitable for withstanding high temperatures in the desorber body. According to one aspect, filter holder 100 comprises aluminum, or an alloy thereof, or stainless steel (e.g., 304L or 316 stainless steel), or combinations thereof. A non-limiting example of a suitable material is aluminum 6061-T651.

C. Desorber Body

The thermal desorber assembly includes a desorber body. The desorber body is suitable for receiving the filter holder and comprises an inlet that can be connected to a mass flow controller and an outlet that can be connected to an analyte collection system or analytical detection system. The desorber body is further designed to be received within an insulating enclosure, as described below.

Figure 2A:
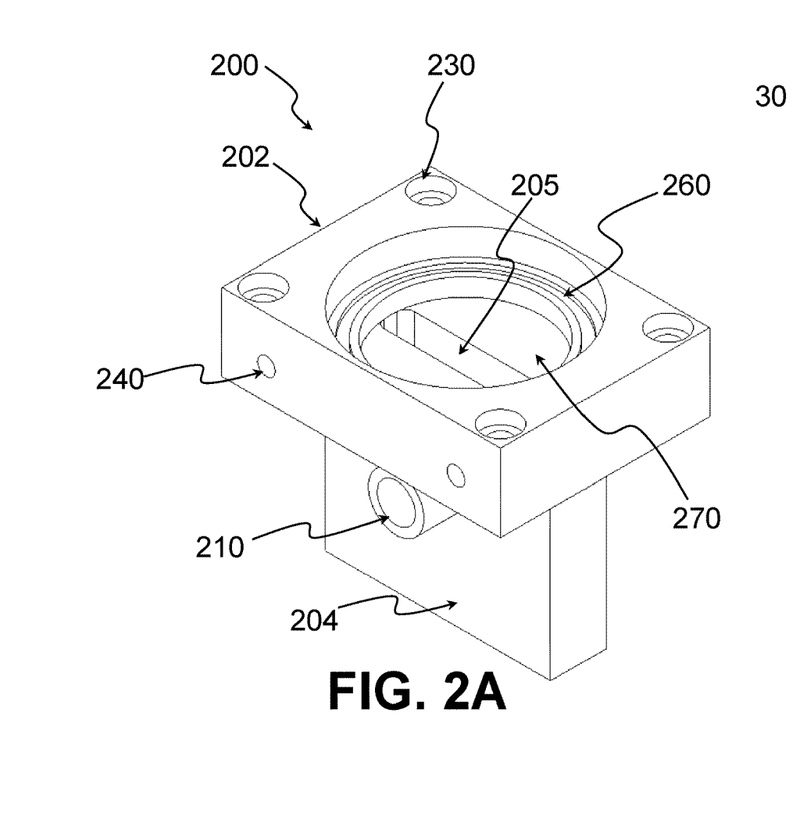
FIGS. 2A-C depict a perspective view (FIG. 2A), a cross-sectional side view (FIG. 2B), and a bottom perspective view (FIG. 2C) of an exemplary embodiment of a desorber body as disclosed herein.
Figure 2B:
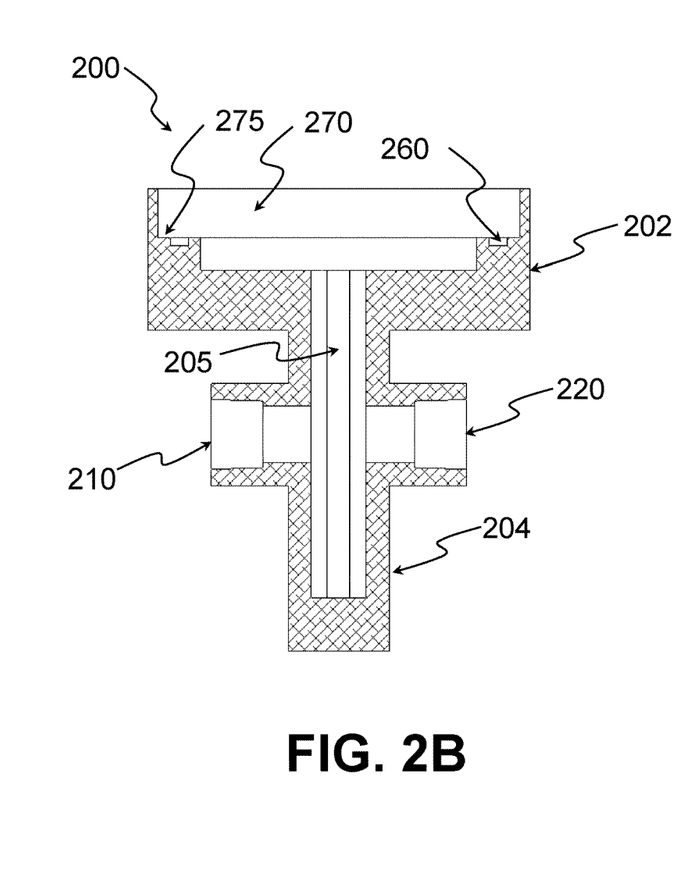
Figure 2C:
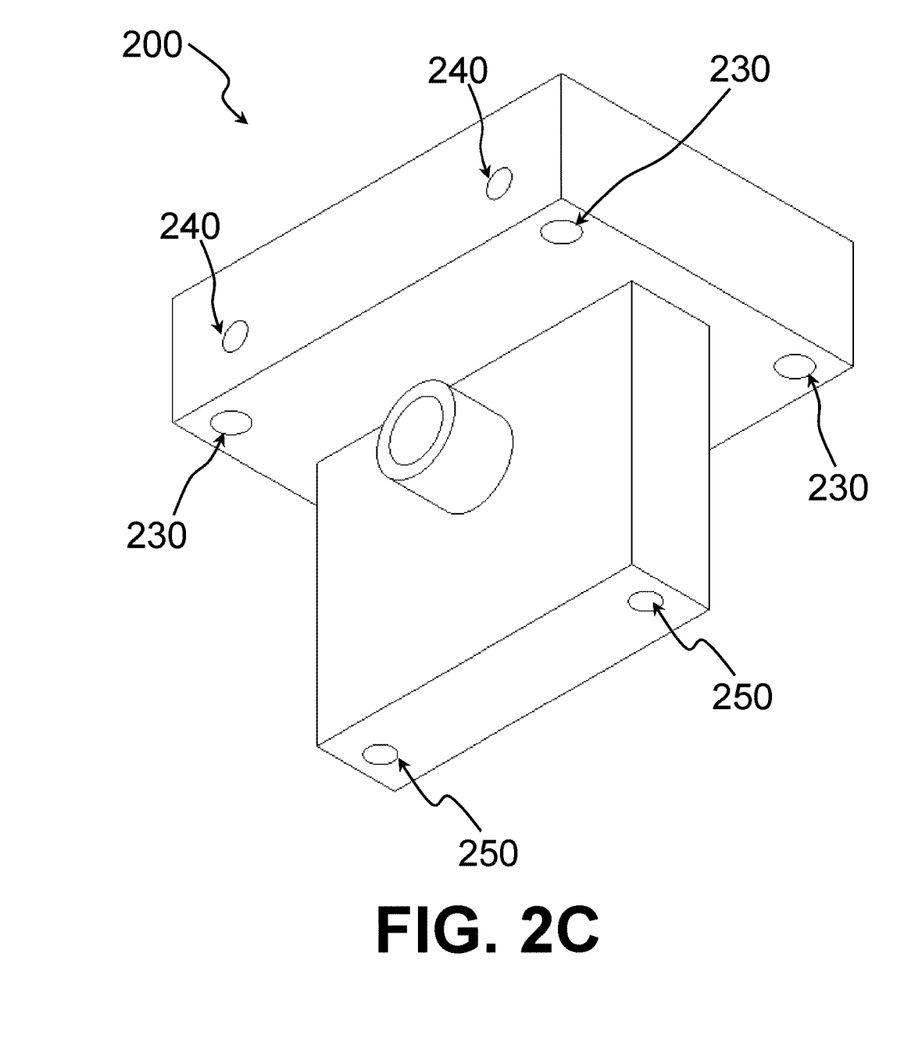
Figure 8:
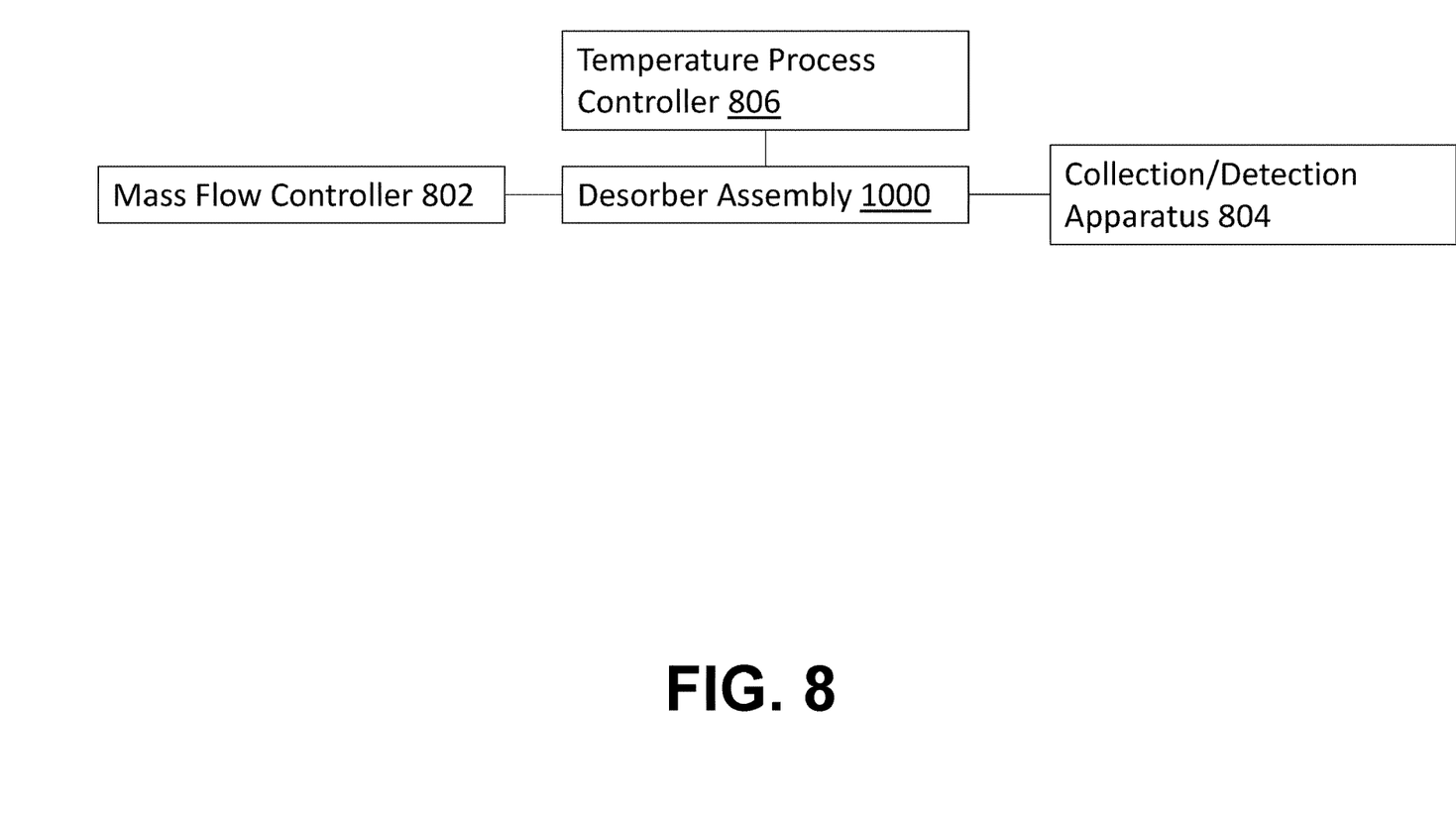
FIG. 8 is a schematic diagram of a system comprising a thermal desorber assembly as disclosed herein.

An exemplary embodiment of the desorber body is depicted in FIGS. 2A-C. Desorber body 200 can define a cavity 205 configured to receive the filter holder 100 when the first and second portions 110, 120 of the holder 100 are in the closed position. In some aspects, the cavity 205 can be configured to complementarily or snugly receive (with minimal clearance) the filter holder 100 to facilitate heat transfer between the desorber body 200 and the filter holder 100. For example, in some optional aspects, the filter holder 100 can have a clearance from interior surfaces of the cavity 205 of less than 0.010 inches, less than 0.005 inches, or less than 0.003 or about 0.001 inches along the first axis 10. In some exemplary aspects, the desorber body 200 can have an upper portion 202 and a lower portion 204. The lower portion 204 of desorber body 200 can further define an inlet 210 configured to connect to a mass flow controller 802 (FIG. 8) and an outlet 220 configured to connect to a collection system or an analytical detection system 804 (FIG. 8) (e.g., sorbent tubes or heated transfer line for online Thermal Desorption-Gas Chromatography-Triple Quadrupole-Mass Spectrometry (TD-GC-QQQ-MS) analysis). Inlet 210 and outlet 220 can at least partially align with the filter holes 140, 150 of the first and second portions 110, 120 of the filter holder 100 when the filter holder is in the closed position and inserted into cavity 205. Optionally, for example, the inlet 210, the outlet 220, and the filter holes 140, 150 of the first and second portions 110, 120 can be coaxial. Inlet 210 and outlet 220 can be threaded (e.g., tapped) and configured to receive a respective connector (e.g., a SWAGELOK connector or other connector) suitable for connecting the inlet to a mass flow controller and for connecting the outlet to the collection/analytical detection system. As shown in FIG. 2B, the cavity 205 can intersect and be in communication with a flow path extending between the inlet 210 and outlet 220, thereby allowing for a filter (held by filter holder 100) to be positioned between the inlet and outlet.

According to one aspect, a top portion 202 of desorber body 200 can define one or more holes 230 that can be used to secure the desorber body within the insulating enclosure, as described below. In one aspect, holes 230 can be through-holes that receive fasteners to couple the desorber body 200 to the insulating enclosure (e.g., via standoffs). The holes 230 can optionally be counterbored, as shown, to receive at least a portion of heads of fasteners extending therethrough. In a further aspect, the top portion 202 of desorber body 200 can define one or more holes 240 that are configured to receive a respective cartridge heater suitable for heating the desorber body, a thermocouple, or a probe for a resistance temperature detector (RTD). Similarly, as shown in FIG. 2C, the bottom portion 204 of the desorber body 200 can define one or more holes 250 that are configured to receive a respective cartridge heater suitable for heating the desorber body, a thermocouple, or a probe for a resistance temperature detector (RTD). In exemplary aspects, all of the holes 240, 250 but one can receive a respective heating element, and the remaining hole can receive a temperature sensor (e.g., a thermocouple or RTD probe). In further aspects, at least one of the holes 240 and at least one of the holes 250 can receive a heating element, and at least one of the holes 240 and at least one of the holes 250 can receive a temperature sensor. Optionally, the holes 240 can be positioned on opposing longitudinal ends of the cavity 205. In further optional aspects, holes 250 can be positioned on opposing longitudinal ends of the cavity 205. In some optional aspects, the holes 250 can extend upwardly into the bottom portion 204 from a bottom surface of the bottom portion.

In the exemplary configuration depicted in FIGS. 2A-2C, when viewed from an end of the desorber body 200, the top portion 202 can be perpendicular or substantially perpendicular to the lower portion 204. As shown, such a configuration can provide the desorber body 200 with a T-shaped profile. Optionally, it is contemplated that the inlet 210 and outlet 220 can project outwardly from opposing outer surfaces of lower portion 204. As shown in FIG. 2A, the top portion 202 can define a recessed area 270 defining a recessed surface 275, and the cavity 205 can extend downwardly from the recessed surface 275, through the thickness of the top portion 202, and into the lower portion 204. Recessed area 270 can also comprise an additional recessed groove 260 (optionally, annular groove) to receive a high temperature O-ring (e.g., an O-ring comprising KALREZ material).

Optionally, the one or more holes 230 can be defined within a top surface of the top portion 202. In exemplary aspects, the one or more holes 230 can comprise a plurality of holes 230 that are spaced about a periphery of the top surface of the top portion 202. Optionally, in these aspects, the top surface can have a rectangular periphery, and respective holes 230 can be positioned at or proximate respective corners of the rectangular periphery. Optionally, the one or more holes 230 can extend through the full thickness of the top portion 202. In further optional aspects, the top portion 202 can have a plurality of side edges that extend along the thickness of the top portion 202. In these aspects, the one or more holes 240 can be defined by a first side edge and extend toward an opposing side edge along a portion of a width of the top portion 202. As shown in FIGS. 2A-2C, the holes 230 and 240 can extend along respective axes that are perpendicular (or substantially perpendicular to one another), with the holes 230 being oriented parallel or substantially parallel to one another, and the holes 240 being oriented parallel or substantially parallel to one another. In exemplary aspects, holes 240 can be sufficiently offset from holes 230 to avoid interference with one another (and with the recessed area and cavity 205).

Accordingly, the top portion 202 of the desorber body 200 can serve as a mounting flange for coupling the desorber body to an insulating enclosure, further disclosed herein. The top portion 202 can further define a complementary structure (e.g., recessed area 270) to cooperate with a lid, further disclosed herein, to seal the filter holder 10 in the cavity. The bottom portion 204 of the desorber body 200 can define the cavity 205 and can further house or contact one or more heating elements (e.g., cartridge heaters received within bores 250) for heating the filter holder and HVS filter therein.

In one exemplary aspect, desorber body 200 can have minimal mass such that heating the desorber body occurs more efficiently. For example, desorber body 200 can have a mass ranging from about 300 grams to about 1,500 grams. In other examples, the desorber body 200 can have a mass of less than 1000 grams, or less than 900 grams, or less than 800 grams, or less than 700 grams, or less than 600 grams. In one embodiment, the mass of desorber body 200 can be about 500 grams. A desorber body with minimal volume requires less time to heat and can be better suited to hold a consistent temperature throughout the body. Similarly, by reducing the mass of the desorber body 200, the desorber body can cool at a more rapid rate, ensuring that the thermal desorber assembly can ramp the temperature for analysis of a HVS filter and cool quickly before analysis of the next filter. Accordingly, the T-shaped profile can serve to minimize the volume of the desorber body 200, including only portions for receiving the filter holder, for sealing the filter therein, for coupling the desorber to the insulating enclosure, and receiving necessary heating elements and temperature sensors.

Desorber body 200 can be made from a material suitable for withstanding high temperatures. According to one aspect, desorber body 200 comprises aluminum, or an alloy thereof, or stainless steel, or combinations thereof. A non-limiting example of a suitable material is aluminum 6061, which exhibits suitable thermal conductivity and machinability.

D. Insulating Enclosure

Figure 3:
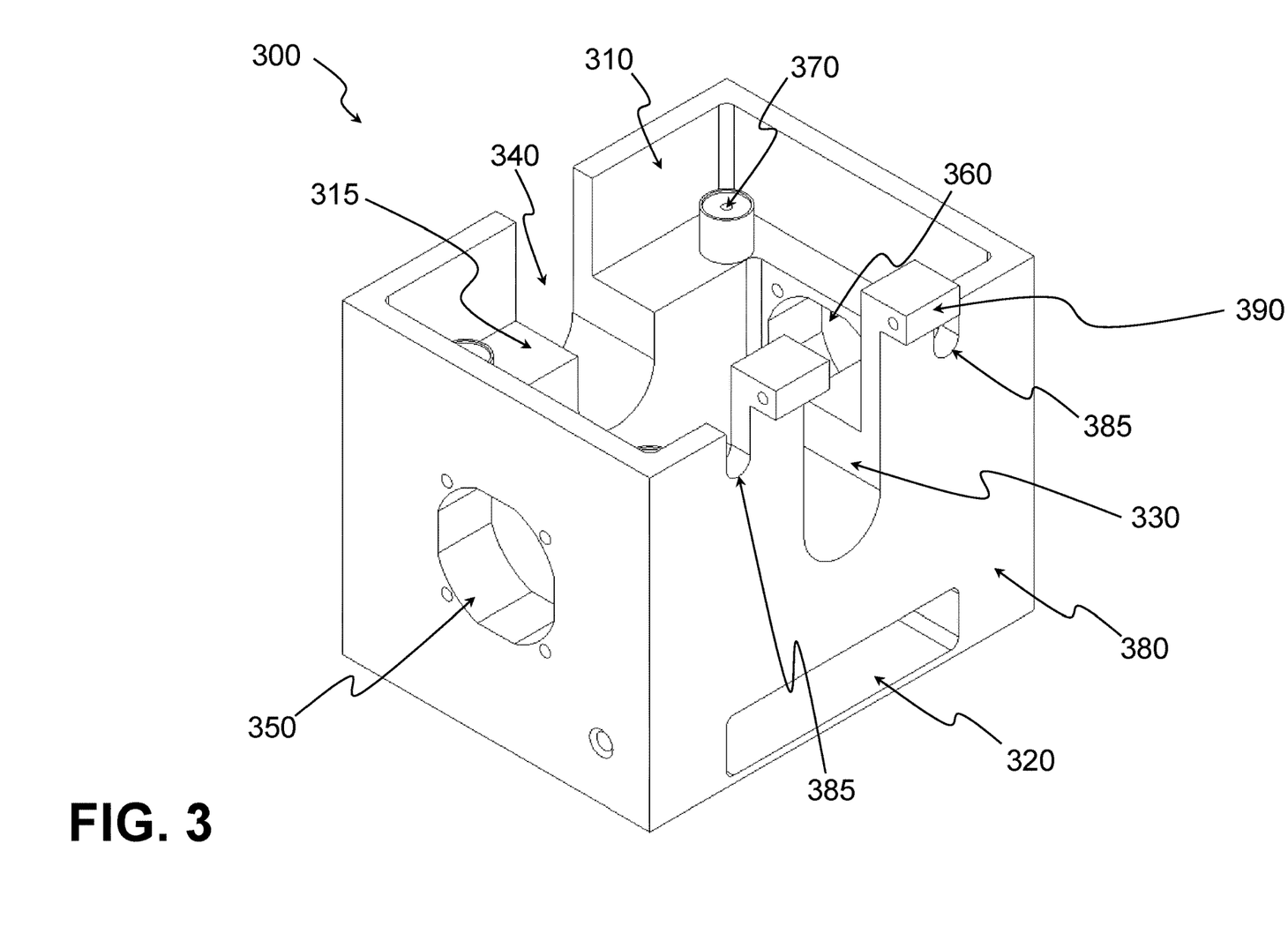
FIG. 3 depicts an exemplary embodiment of an insulating enclosure that receives the desorber body as disclosed herein.

The thermal desorber assembly can also comprise an insulating enclosure. The insulating enclosure can act as a stabilizing base for the desorber body. An exemplary embodiment of the insulating enclosure is depicted in FIG. 3. Insulating enclosure 300 can be configured to receive the desorber body 200 within cavity 310. Enclosure 300 can also define opening 320 which is configured to receive one or more cartridge heater wire leads and/or leads to a thermocouple or resistance temperature detector probe. The insulating enclosure 300 can further define slots 385 that extend downwardly from an upper edge of the insulating enclosure and can receive therethrough conductors (e.g., cables or wires) therethrough from the thermocouples, heaters, or RDT probe associated with the desorber body 200.

Additionally, insulating enclosure 300 can further define port openings 330 and 340. Port openings 330 and 340 can be at least partially aligned with the inlet 210 and outlet 220 of the desorber body 200 when the desorber body is inserted into cavity 310 of insulating enclosure 300. Openings 330 and 340 can be configured to receive a suitable connecter, e.g., a SWAGELOK connector, which can connect to a suitable gas or exhaust line. In exemplary aspects, openings 330 and 340 can be aligned along an axis extending through the cavity 310. Optionally, openings 330 and 340 can be U-shaped or substantially U-shaped, with the openings being defined by vertical or substantially vertical side surfaces and a concave bottom surface extending between the vertical side surfaces, as depicted in the exemplary embodiment shown in FIG. 3. It is contemplated that such a shape of the openings 330, 340 can be easily machined. According to one aspect, insulating enclosure 300 can further define openings 350 and 360. Openings 350 and 360 can be configured to receive air blown from a respective fan 365 (FIG. 6) attached to the enclosure at each of the openings 350, 360, optionally, via spacers (e.g., standoffs). The fans 365 can be useful for cooling the assembly after analysis of a filter. In exemplary aspects, openings 350 and 360 can be aligned along an axis extending through the cavity 310. Optionally, the axis along which openings 350 and 360 are aligned can be perpendicular or substantially perpendicular to an axis along which openings 330 and 340 are aligned. In exemplary aspects, the fans 365 can direct air in the same direction (e.g., one fan can be configured to blow air into the opening 350, and another fan can be configured to draw air from the opening 360 to generate cross-flow through the insulating enclosure and optimize cooling rate.

According to a further aspect, insulating enclosure 300 can comprise spacers 370 (e.g., insulating standoffs) that extend upwardly from a recessed shelf 315 defined within cavity 310. In exemplary aspects, the recessed shelf 315 can be recessed from a top surface of enclosure 300 and project inwardly from an inner surface of the enclosure that defines the cavity 310. The standoffs 370 can define a recessed area suitable to receive ceramic spacers or another suitable insulating material. In further aspects, the standoffs 370 can comprise insulating material (optionally, ceramic insulating material). One or more standoffs 370 can further define a hole, optionally, a tapped hole, suitable for securing the desorber body 200 to the enclosure or a through-hole through which a fastener 605 (FIG. 6) can extend and into a threaded opening in the shelf 315. Thus, in one aspect, the desorber body 200 can be secured within cavity 310 of insulating enclosure 300 but not be in physical contact with the enclosure body. This can prevent metal-to-metal contact, and therefore prevent heat transfer between the desorber body 200 and insulating enclosure 300. In this way, the gas (e.g., air) barrier between the desorber body 200 and the insulating enclosure 300 can insulate the desorber body. According to one aspect, insulating enclosure 300 can further comprise external insulation, e.g., fiber glass insulation, as a safety precaution.

Insulating enclosure 300 can be made from a material suitable for withstanding high temperatures. According to one aspect, insulating enclosure 300 comprises aluminum, or an alloy thereof, or stainless steel (e.g., 304L or 316 stainless steel), or combinations thereof. A non-limiting example of a suitable material is aluminum 6061.

E. Lid and Locking Base for Sealing Desorber Body

According to one aspect, the thermal desorber assembly can comprise a lid suitable for sealing the desorber body when the filter holder is inserted into the body. Still further, the lid can cooperate with the insulating enclosure to enclose the desorber body 200 therein. In some optional aspects, the lid can hingedly couple to the insulating enclosure 300. The lid can be configured to create an airtight seal in the thermal desorber assembly. The lid can generally comprise a base that seals the desorber body, a handle to open and close, and one or more projections on the top that engage a latch to secure the lid to the locking base.

Figure 4A:
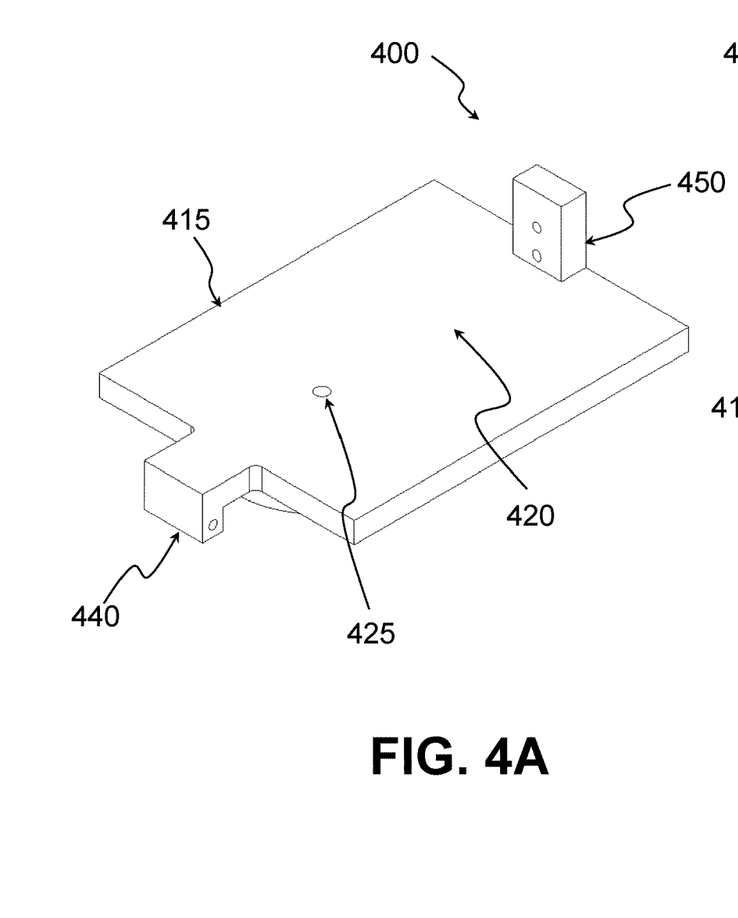
FIGS. 4A-B depict isometric views of the top (FIG. 4A) and bottom (4B) of an exemplary embodiment of a hinged lid suitable for sealing the desorber body and a thermal desorber unit as disclosed herein.
Figure 4B:
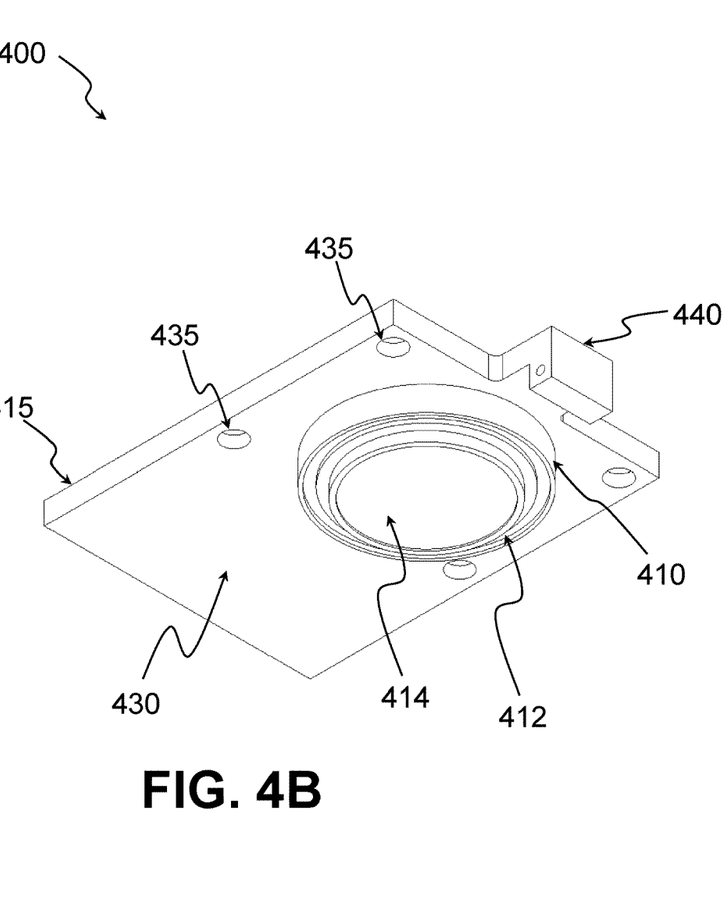

An exemplary embodiment of the lid is depicted in FIGS. 4A-B. Lid 400 can comprise a base 410 suitable for sealing the cavity 205 of the desorber body 200 with the filter holder 1 (therein. Optionally, the base 410 can be cylindrical or substantially cylindrical. In this way, the base 410 can be received within the recess 270. Accordingly, in various aspects, the shape of the base 410 can be complementary to the shape of the recess 270. Base 410 can include a recessed groove 412 (optionally, an annular recess) at the bottom of the base for receiving an O-ring or other sealing element, which can create a seal with the cavity of the desorber body. The recessed groove 412 and recessed groove 260 can align so that the O-ring or other sealing element is compressed within each of the recessed grooves 412, 260. Additionally, base 410 can comprise a sealing material (optionally, a high temperature gasket, such as, for example, a KALREZ material gasket) that can form an airtight seal with the cavity 205 of the desorber body 200. Optionally, said sealing material can be received within and bonded to a recessed cut out 414. Optionally, as shown in FIGS. 4A-4B, the lid 400 can further comprise a body portion 415 from which the base 410 projects. The body portion 415 can be configured to cover an entirety, or substantially an entirety of a top opening of the insulating enclosure.

Figure 6:
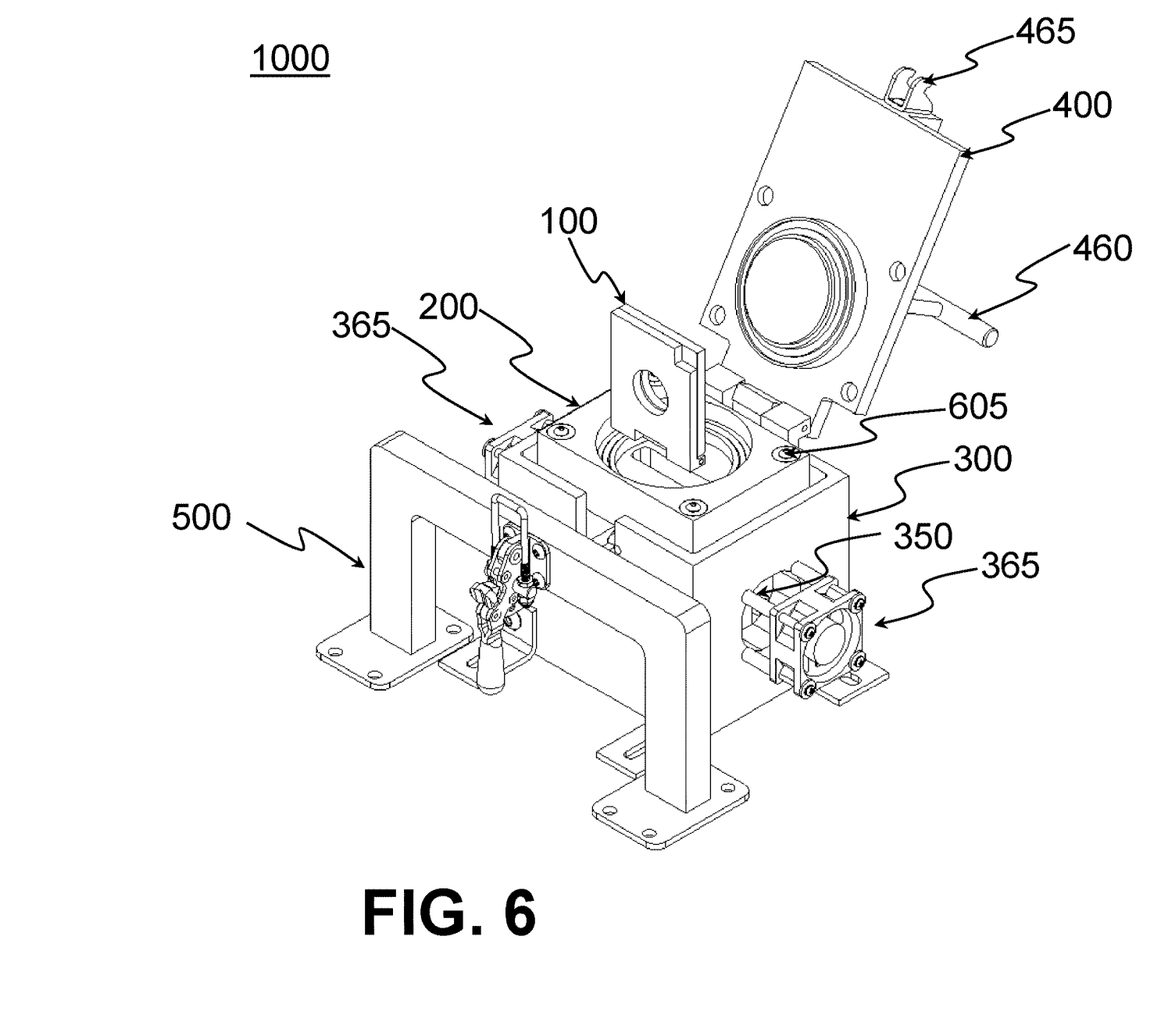
FIG. 6 depicts an exemplary embodiment of a thermal desorber assembly in an open configuration as disclosed herein.
Figure 7:
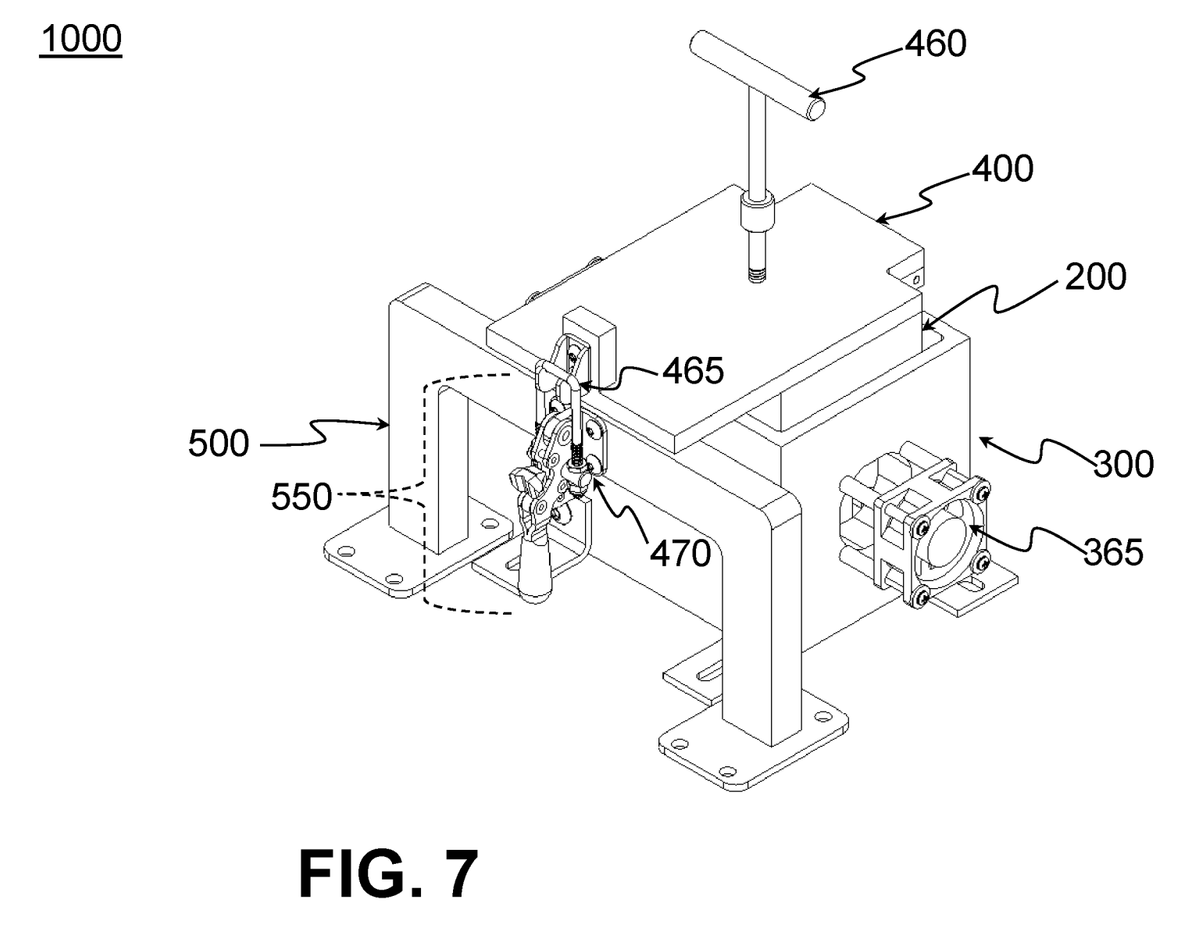
FIG. 7 depicts an exemplary embodiment of the thermal desorber assembly in a sealed configuration as disclosed herein.

Referring also to FIGS. 6-7, lid 400 can also comprise a top 420 and bottom 430 portion of body 415. Top portion 420 can include an extruded rectangular tab 450 that projects outwardly (e.g., upwardly) from a top surface of the body 415. Rectangular tab 450 can further define holes, e.g., tapped holes, suitable for securing a retainer 465 (FIGS. 6-7) such as, for example, a hooked structure or one or more projections that are configured to engage a latch 470 (FIGS. 6-7). Top portion 420 can define an opening 425 (optionally, a threaded opening) suitable to receive and couple to a handle 460 (e.g., optionally, a commercial-off-the-shelf (COTS) handle) as shown in FIG. 6. The handle 460 can extend sufficiently from the body 415 so that its gripping portion is cool enough for a user to touch. Bottom portion 430 can define recessed holes 435 that are positioned to receive heads of fasteners 605 when the lid is in a closed position (FIG. 7). Lid 400 can also comprise a tap (e.g., an L-shaped tab) 440 that extends downwardly from the body 415 when the lid is in the closed position. The tab 440 can define a through hole that can receive a pivot pin that also extends through tabs (e.g., L-shaped tabs) 390 (FIG. 3) of the insulating enclosure 300 to define a hinge coupling to the insulating enclosure. Lid 400 can be made from a material suitable for withstanding high temperatures. According to one aspect, removable cap 400 comprises aluminum, or an alloy thereof, or stainless steel (e.g., 304L or 316 stainless steel), or combinations thereof. A non-limiting example of a suitable material is aluminum 6061.

Figure 5:
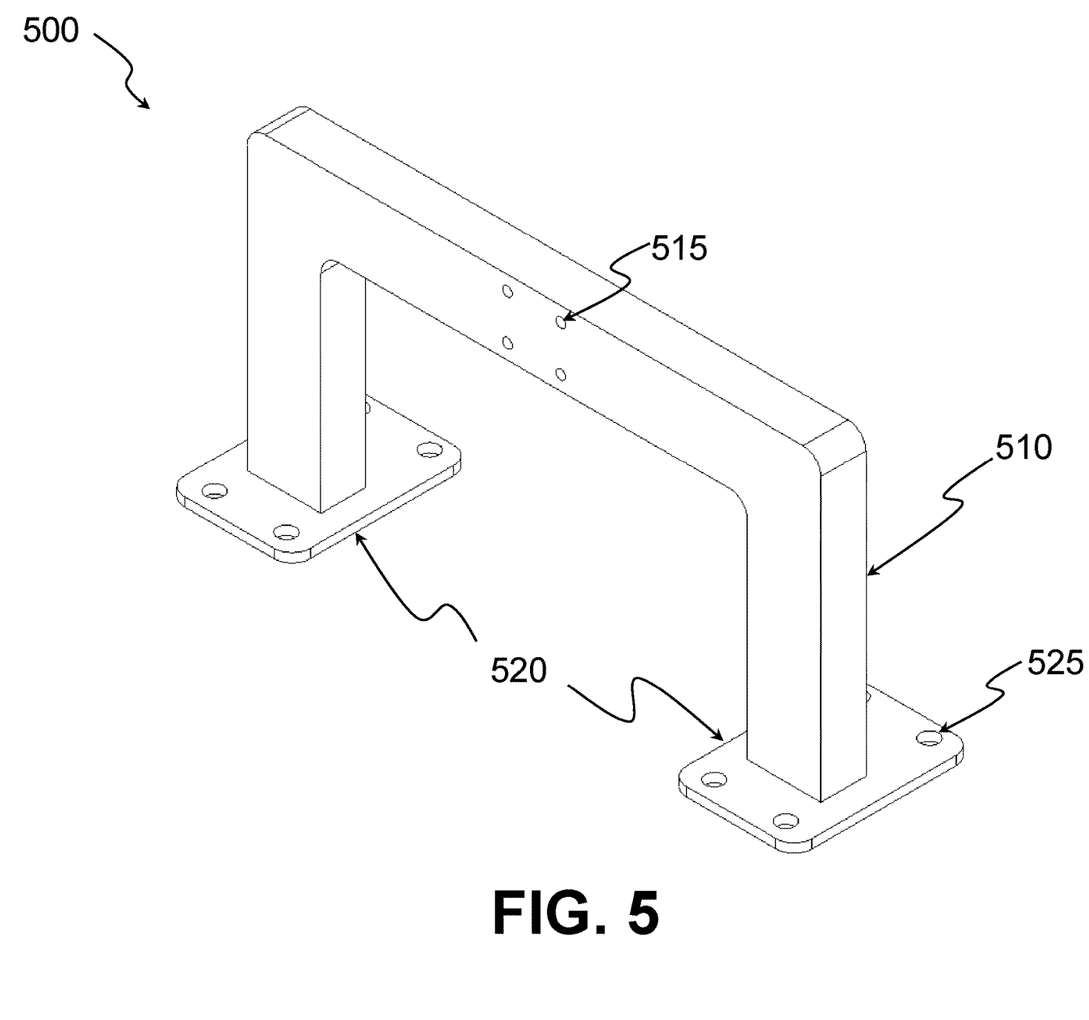
FIG. 5 depicts an isometric view of an exemplary embodiment of a locking base as disclosed herein.

An exemplary embodiment of the locking base is depicted in FIG. 5. In one aspect, the locking base 500 can comprise a U-shaped arch 510. The arch can have two bottom support flanges 520 that define a plurality of through-holes 525 for receiving fasteners. In this way, the support platforms 520 can stabilize the locking base 500 to enable attachment to a base structure, such as a tabletop or breadboard using fasteners (e.g., COTS screws). Accordingly, the locking base 500 can be fixedly positioned relative to the insulating body 300 but not in direct contact with the insulating body to inhibit heat transfer therebetween. The U-shaped arch 510 can also have a plurality of threaded holes that can receive fasteners for coupling the latch 470. In some optional aspects, the latch 470 can be embodied as a COTS latch (e.g., a McMaster-Carr P/N 51335A71 latch). The latch 470 and locking base 500 can cooperate to define a locking assembly 550, as shown for example in FIG. 7.

F. Thermal Desorber Assembly and Method of Using the Assembly

An exemplary embodiment of the thermal desorber assembly 1000 is depicted in FIG. 6. Desorber body 200, can be inserted into insulating enclosure 300 and fastened in place using a plurality of (e.g., four) COTS screws or other fasteners. Desorber body 200 can then be heated to a desired temperature via the heating elements (e.g., cartridge heaters embedded within the desorber body in holes 240 and or holes 250). Temperature can be controlled through a feedback loop using an embedded thermocouple or RTD placed in the desorber body and a temperature process controller 806.

Optionally, the desorber body 200 can be held at a single, static temperature set point. In further optional aspects, the desorber body can be heated at a dynamic (e.g., ramping) temperature over a set period of time. The desired HVS filter media can be inserted into filter holder 100 by placing it inside one of the recessed filter holes of the first portion 110 or second portion 120 of filter holder 100. Filter holder 100 can be secured in a closed position using the hinge and magnets (or other fasteners).

Filter holder 100 can then be inserted inside the cavity 205 of desorber body 200. Lid 400 can then be closed onto the desorber body and locked in place with the locking base via the latch 470. Lid 400 can create an airtight seal using a suitable O-ring and gasket (e.g., comprising KALREZ material). The sealed thermal desorber assembly is shown in FIG. 7.

Once a test has been completed and the HVS filter is fully desorbed, the temperature controller (optionally, an OMEGA temperature controller) can be ramped down. External fans connected to the insulating enclosure 300 can speed up the cooling process, e.g., allowing for the thermal desorber assembly to quickly cool, with the time required for cooling depending on the maximum temperature of the desorber before starting the cooling process. In exemplary aspects, the desorber assembly can cool in about 10 minutes or in less than 10 minutes.

Aside from the temperature control, another user-controlled parameter of the thermal desorber assembly is the flow of clean gas used to purge the assembly. Purge gas can flow through the desorber body and the filter in order to desorb the adsorbed molecules from the HVS filter. The purge gas can be controlled by a mass flow controller connected to the desorber body inlet. The gas can be heated inside the desorber body and can flow through the HVS filter media. The gas can then exit through the outlet of the desorber body onto a vapor capture system, such as a thermal desorption sorbent tube, or to a heated transfer line connected to a cold trap for subsequent quantification by an analytical instrument (e.g., gas chromatograph-mass spectrometer).

Those skilled in the art will recognize, or be able to ascertain using no more than routine experimentation, many equivalents to the specific embodiments of the thermal desorber assembly, system, and method described herein. Such equivalents are intended to be encompassed by the following claims.

What is claimed is:

1. A thermal desorber assembly for a high-volume sampling (HVS) filter, comprising:
   a. a filter holder having a first portion and a second portion hingedly secured to the first portion, wherein the first and second portions are configured to rotate about a hinged axis from an open position to a closed position, wherein the first and second portions each define a respective filter hole, wherein at least one of the first or second portions defines a recess that at least partially surrounds the respective filter hole and is configured to receive a filter therein,
   wherein the filter holes of the first and second portions align when the first and second portions are in the closed position, and wherein the first and second portions cooperate to secure the filter in place within the recess of the at least one of the first and second portions when the first and second portions are in the closed position;
   b. a desorber body defining a cavity configured to receive the filter holder when the first and second portions of the holder are in the closed position,
   the desorber body further defining an inlet configured to connect to a mass flow controller and an outlet configured to connect to a vapor collection system or an analytical detection system,
   wherein the inlet and the outlet at least partially align with the recessed filter holes of the first and second portions of the filter holder when the filter holder is inserted into the cavity; and
   c. an insulating enclosure configured to receive the desorber body therein.

2. The thermal desorber assembly of claim 1, wherein the desorber body further defines at least one hole that is configured to receive therein a heating element and at least one hole that is configured to receive therein a temperature sensor.

3. The thermal desorber assembly of claim 2, wherein the insulating enclosure defines an opening configured to receive one or more cartridge heater wire leads, one or more thermocouple wire leads, or one or more resistance temperature detector probe wire leads.

4. The thermal desorber assembly of claim 3, wherein the insulating enclosure further defines port openings positioned to at least partially align with the inlet and the outlet of the desorber body when the desorber body is inserted into the insulating enclosure.

5. The thermal desorber assembly of claim 1, wherein the first and second portions of the filter holder each comprise a respective magnet, and the first and second portions magnetically secure to one another when the first and second portions are in the closed position.

6. The thermal desorber assembly of claim 1, wherein the insulating enclosure comprises insulating spacers positioned to support the desorber body and prevent the desorber body from contacting an interior surface of the insulating enclosure.

7. The thermal desorber assembly of claim 6, wherein the insulating enclosure has an inner surface that defines a cavity and a recessed shelf that projects inwardly from the inner surface, wherein the insulating spacers extend upwardly from the recessed shelf.

8. The thermal desorber assembly of claim 1, further comprising a lid configured to seal the cavity of the desorber body when the filter holder is inserted into the body.

9. The thermal desorber assembly of claim 8, further comprising a locking assembly comprising a locking base and a latch, wherein the latch is configured to receive at least a portion of the lid to retain the lid in a closed position, wherein the locking base is spaced from and not in direct contact with the insulating enclosure.

10. The thermal desorber assembly of claim 8, wherein the lid is configured to cooperate with the insulating enclosure to enclose the desorber body.

11. A thermal desorber assembly system for a high-volume sampling (HVS) filter, comprising:
    a. a mass flow controller,
    b. a collection/detection apparatus, wherein the collection/detection apparatus comprises a vapor collection apparatus or an analytical detection apparatus;
    c. a filter holder having a first portion and a second portion hingedly secured to the first portion, wherein the first and second portions are configured to rotate about a hinged axis from an open position to a closed position, wherein the first and second portions each define a respective filter hole, wherein at least one of the first or second portions defines a recess that at least partially surrounds the respective filter hole and is configured to receive a filter therein,
    wherein the filter holes of the first and second portions align when the first and second portions are in the closed position, and wherein the first and second portions cooperate to secure the filter in place within the recess of the at least one of the first and second portions when the first and second portions are in the closed position;

d. a desorber body defining a cavity configured to receive the filter holder when the first and second portions of the holder are in the closed position, the desorber body further defining an inlet connected to the mass flow controller and an outlet connected to the collection/detection apparatus, wherein the inlet and the outlet at least partially align with the recessed filter holes of the first and second portions of the filter holder when the filter holder is inserted into the cavity; and e. an insulating enclosure configured to receive the desorber body therein.

12. The thermal desorber assembly system of claim 11, wherein the desorber body further defines at least one hole that is configured to receive therein a heating element and at least one hole that is configured to receive therein a temperature sensor, wherein the thermal desorber assembly system further comprises:

a. a heating element received within the at least one hole that is configured to receive therein the heating element; and b. a temperature sensor received within each hole that is configured to receive the temperature sensor.

13. The thermal desorber assembly system of claim 12, further comprising a temperature process controller, wherein the temperature process controller is in communication with each heating element and each temperature sensor, wherein the temperature process controller is configured to control a temperature of the desorber body based on feedback from the temperature sensor.

14. The thermal desorber assembly system of claim 11, wherein the desorber body has a mass that is less than 600 grams.

15. The thermal desorber assembly system of claim 11, wherein the first and second portions of the filter holder each comprise a respective magnet, and the first and second portions magnetically secure to one another when the first and second portions are in the closed position.

16. The thermal desorber assembly system of claim 11, wherein the insulating enclosure comprises insulating spacers positioned to support the desorber body and prevent the desorber body from contacting an interior surface of the insulating enclosure.

17. The thermal desorber assembly system of claim 16, wherein the insulating enclosure has an inner surface that defines a cavity and a recessed shelf that projects inwardly from the inner surface, wherein the insulating spacers extend upwardly from the recessed shelf.

18. The thermal desorber assembly system of claim 11, further comprising a lid configured to seal the cavity of the desorber body when the filter holder is inserted into the body.

19. The thermal desorber assembly system of claim 18, further comprising a locking assembly comprising a locking base and a latch, wherein the latch is configured to receive at least a portion of the lid to retain the lid in a closed position, wherein the locking base is spaced from and not in direct contact with the insulating enclosure.

20. The thermal desorber assembly system of claim 18, wherein the lid is configured to cooperate with the insulating enclosure to enclose the desorber body.

* * * * *